US011726240B2

(12) United States Patent
Yasumura

(10) Patent No.: US 11,726,240 B2
(45) Date of Patent: Aug. 15, 2023

(54) VARIABLE MESH LOW MASS MEMS MIRRORS

(71) Applicant: Google LLC, Mountain View, CA (US)

(72) Inventor: Kevin Yasumura, Lafayette, CA (US)

(73) Assignee: Google LLC, Mountain View, CA (US)

( * ) Notice: Subject to any disclaimer, the term of this patent is extended or adjusted under 35 U.S.C. 154(b) by 117 days.

(21) Appl. No.: 17/120,749

(22) Filed: Dec. 14, 2020

(65) Prior Publication Data

US 2021/0255373 A1 Aug. 19, 2021

Related U.S. Application Data

(60) Provisional application No. 62/976,814, filed on Feb. 14, 2020.

(51) Int. Cl.
*G02B 5/09* (2006.01)
*G02B 26/08* (2006.01)

(52) U.S. Cl.
CPC ........... *G02B 5/09* (2013.01); *G02B 26/0833* (2013.01)

(58) Field of Classification Search
CPC ...... G02B 5/0808; G02B 5/09; G02B 7/1821; G02B 7/192; G02B 7/198; G02B 26/0833
USPC ........................................ 359/848, 850, 872
See application file for complete search history.

(56) References Cited

U.S. PATENT DOCUMENTS

| 5,083,857 | A | | 1/1992 | Hornbeck | |
| 5,825,565 | A | * | 10/1998 | Papenburg | C04B 41/89 359/585 |
| 6,924,914 | B2 | * | 8/2005 | Kato | G02B 7/1821 359/290 |
| 6,943,448 | B2 | | 9/2005 | Gabriel et al. | |
| 7,202,101 | B2 | | 4/2007 | Gabriel et al. | |
| 9,411,127 | B2 | * | 8/2016 | Devilliers | G02B 5/08 |
| 9,946,062 | B1 | * | 4/2018 | Tauscher | B81B 3/0072 |
| 2002/0071169 | A1 | | 6/2002 | Bowers et al. | |
| 2004/0130766 | A1 | * | 7/2004 | Dewa | G02B 26/085 359/224.1 |
| 2004/0131512 | A1 | * | 7/2004 | Abe | B01D 46/24491 422/177 |
| 2005/0078169 | A1 | | 4/2005 | Turner | |
| 2006/0051022 | A1 | | 3/2006 | Levner et al. | |
| 2007/0047046 | A1 | * | 3/2007 | Ji | G02B 26/0841 359/224.1 |

(Continued)

FOREIGN PATENT DOCUMENTS

CN 1732398 A 2/2006
CN 102768381 A 11/2012
(Continued)

OTHER PUBLICATIONS

First Office Action for Chinese Patent Application No. 202110049540.9 dated Jun. 14, 2022. 7 pages.

(Continued)

*Primary Examiner* — Ricky D Shafer
(74) *Attorney, Agent, or Firm* — Lerner David LLP

(57) ABSTRACT

The present disclosure provides a component, such as a MEMS mirror or other generally disc-shaped component, having a variable mesh pattern across a backside surface thereof. The variable mesh includes ribs having a first thickness near a center portion or axis of rotation of the components, and a second narrower thickness at portions farther from the center or axis of rotation.

19 Claims, 12 Drawing Sheets

(56) References Cited

U.S. PATENT DOCUMENTS

| | | |
|---|---|---|
| 2010/0277779 A1 | 11/2010 | Futterer et al. |
| 2010/0290142 A1* | 11/2010 | Krastev .............. G02B 26/0833 359/872 |
| 2014/0327946 A1* | 11/2014 | van Lierop ............ G02B 26/10 359/198.1 |
| 2014/0353530 A1 | 12/2014 | Chang-Hasnain et al. |
| 2018/0172904 A1 | 6/2018 | Sugama |
| 2018/0314057 A1 | 11/2018 | Yasumura |
| 2018/0329163 A1 | 11/2018 | Sadasivan et al. |

FOREIGN PATENT DOCUMENTS

| | | |
|---|---|---|
| CN | 104216109 A | 12/2014 |
| EP | 1275997 A2 | 1/2003 |
| EP | 1757972 A1 | 2/2007 |
| JP | 6248296 B2 | 12/2017 |
| KR | 20060124079 A | 12/2006 |
| TW | 201413297 A | 4/2014 |
| WO | 2009044360 A1 | 4/2009 |

OTHER PUBLICATIONS

Extended European Search Report for European Patent Application No. 21156286.3 dated Jun. 28, 2021. 10 pages.
Office Action for Taiwanese Patent Application No. 110104868 dated Feb. 8, 2023. 9 pages.

\* cited by examiner

VARIABLE MESH LOW MASS MEMS MIRRORS

CROSS-REFERENCE TO RELATED APPLICATIONS

The present application claims the benefit of the filing date of U.S. Provisional Patent Application No. 62/976,814 filed Feb. 14, 2020, the disclosure of which is hereby incorporated herein by reference.

BACKGROUND

Optical communications use modulated light beams to convey information through optical fibers, free space, or waveguides. A beam of light can be modulated either directly by modulating current to a light source, or externally by using an optical modulator to modulate a continuous-wave light beam produced by the light source. External modulation has advantages in that it can handle higher power and frequencies; however, the required components can be larger, more complex, and more expensive.

An optical circuit switch (OCS) is an all-optical, 3D switching matrix that can direct light from any input fiber N to any output fiber M by changing the angles of the mirrors in two 2D micro-electromechanical system (MEMS) mirror arrays. The switch is designed for low insertion loss over a broad wavelength range, so each fiber can carry many wavelengths. The OCS is also designed for fast, reliable switching by the MEMS mirror arrays. Optical performance requirements include insertion loss, return loss, dynamic optical crosstalk, and static optical crosstalk.

SUMMARY

One aspect of the disclosure provides a component, including a region having a perimeter and a first surface, at least one axis of rotation, and a layer on the first surface, the layer including a variable mesh pattern, wherein the variable mesh pattern comprises a plurality of ribs, the ribs having a first width near the at least one axis of rotation and a second width at portions of the first surface farther from the axis of rotation, the first width being greater than the second width. The first width may taper to the second width. The layer may have a mass distributed across the first surface such that a center portion of the first surface bears a greater proportion of the mass as compared to portions near the perimeter. The variable mesh pattern may be a symmetrical pattern. The plurality of ribs may be interconnected.

According to some examples, the component may be a mirror and the first surface is a backside non-reflective surface. The at least one axis of rotation may extend across a center portion of the component, such that the first width of the ribs is near the center portion of the component and the second width of the ribs is near one or more boundaries of the perimeter.

Another aspect of the disclosure provides a micro-electromechanical systems (MEMS) mirror assembly, including a plate including a plurality of cavities, at least one mirror, the at least one mirror having a reflector region rotatable about at least a first axis, the at least one mirror having a perimeter and a first surface, the at least one mirror located within a respective one of the plurality of cavities. The reflector region may include a layer on the first surface, the layer including a variable mesh pattern, wherein the variable mesh pattern comprises a plurality of ribs, the ribs having a first width near the first axis and a second width at portions of the first surface farther from the first axis, the first width being greater than the second width. The first width transitions to the second width. The transition may be a gradual taper. The layer may have a mass distributed across the first surface such that a center portion of the first surface bears a greater proportion of the mass as compared to portions near the perimeter. The variable mesh pattern may be a symmetrical pattern. The reflector region of the at least one mirror may further be rotatable about a second axis, and the ribs may have a greater width near the second axis as compared to near the perimeter.

Yet another aspect of the disclosure provides a method of fabricating a MEMS mirror, including applying a layer to a non-reflective surface of a reflector region of the MEMS mirror, the reflector region defined by a perimeter, and forming a variable mesh pattern in the layer, wherein the variable mesh pattern defines a plurality of ribs, the ribs having a first width near a center of the reflector region and a second width near the perimeter, the first width being greater than the second width. Forming the variable mesh pattern may include removing at least a portion of the layer from the first surface to create the plurality of ribs. Removing a portion of the layer may include removing less than a full depth of the layer in a given area. In other examples, forming the variable mesh pattern includes selectively depositing material onto the first surface in the variable mesh pattern.

The layer may have a mass distributed across the first surface such that a center portion of the first surface bears a greater proportion of the mass as compared to portions near the perimeter. The variable mesh pattern may be a symmetrical pattern, where each of the plurality of ribs are interconnected.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to a component, such as a MEMS mirror or other generally disc-shaped component, having a variable mesh pattern across a backside surface of the mirror or other disc-shaped component. As such, the variable mesh pattern provides for increased relative stiffness of the mirror, as compared to a mirror supported by a uniform mesh or a solid layer, while decreasing the relative moment of inertia of the mirror or other disc-shaped component. While the variable mesh technique is described below in connection with MEMS mirrors and optical network systems, it should be understood that the variable mesh techniques may be applied in any of a number of different fields. By way of example only, such techniques may be implemented in telecommunications, LIDAR, free space optical communications (FSOC), etc.

The component may have a perimeter and a first surface, such as a backside surface where the component is a mirror. A layer may be applied to the first surface and a pattern may be etched into the layer, the pattern creating the variable mesh. According to other examples, material may be deposited onto the backside surface in an additive process such that the deposited material forms the variable mesh.

The variable mesh pattern may define a plurality of ribs. The ribs closest to the center may have a first thickness. The ribs closest to the perimeter may have a second thickness. The first thickness may be greater than the second thickness. Thus, the ribs closest to the center may be wider than the ribs closest to the perimeter. The ribs may taper or transition from the first thickness to the second thickness. In contrast, a constant mesh may occur when a pattern is etched into the layer such that the ribs defined by the pattern have an equal width throughout the reflector region. A complete layer may be an un-etched layer applied continuously to the backside surface of the mirror.

The mirror or other disc-shaped component may be positioned in a device or system such that it is movable about one or more axes. For example, the mirror may be a MEMS mirror positioned in an optical signal routing system, and may be rotatable about an x axis and a y axis. The variable mesh on the backside surface of the MEMS mirror provides stiffness to the mirror, thereby preventing the mirror from curling up or otherwise becoming deformed. The variable mesh also improves the moment of inertia about the one or more axes.

Figure 1:
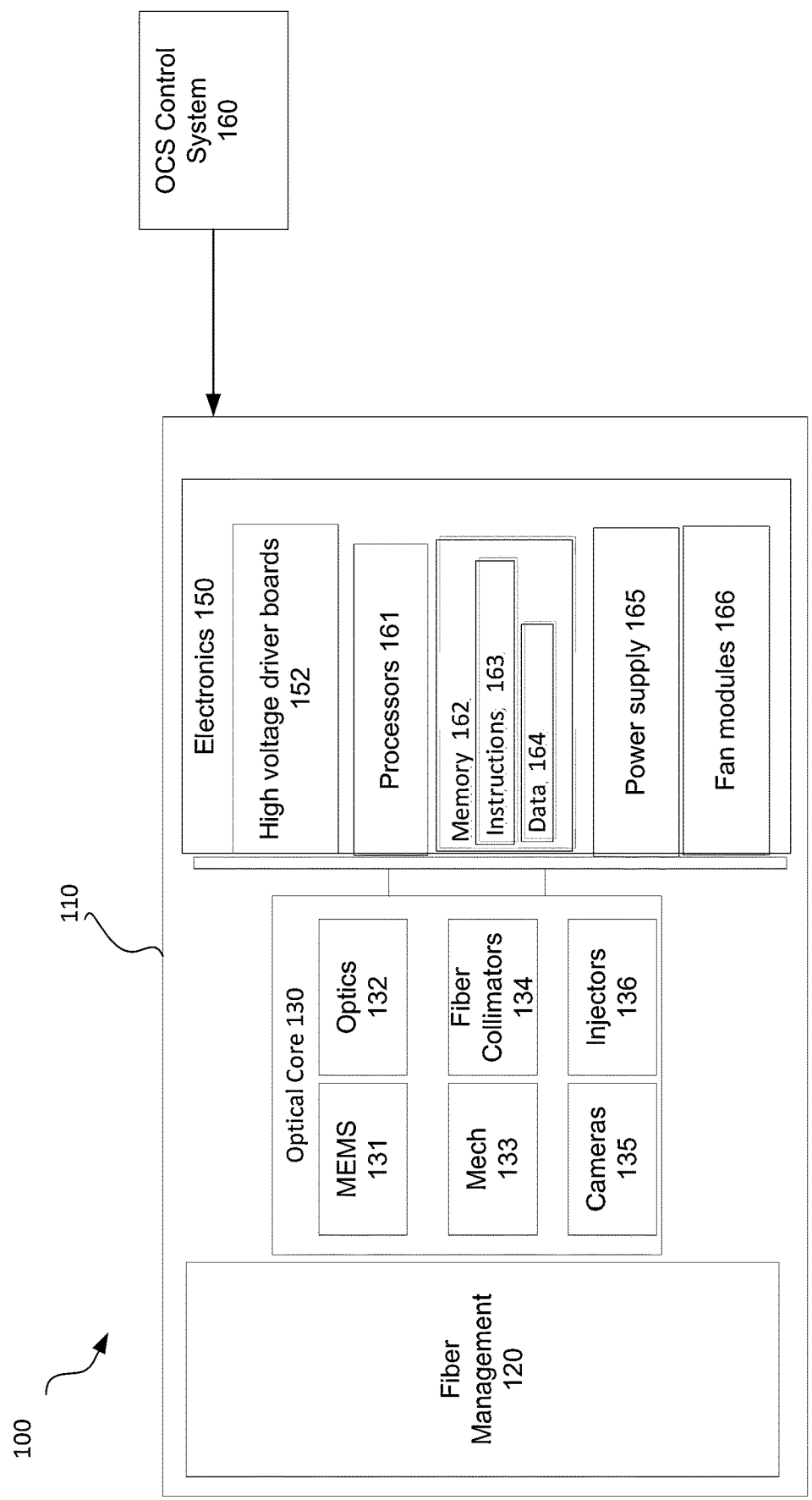
FIG. 1 is a block diagram illustrating an OCS according to aspects of the disclosure.

FIG. 1 illustrates an example OCS 100, such as may be used in datacenter. The OCS 100 includes a structure such as chassis 110 supporting a number of components. In front of the OCS chassis 110 are optical fiber connections, such as fiber management block 120. The OCS 100 may further include, such as in the middle, an optical core 130. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fiber fanouts are spliced to the fiber collimators 134.

The fiber collimators 134 are lensed fiber arrays. Just as one example, the fiber collimators 134 may include tens or hundreds or more fiber arrays. The fibers are assembled in a hole array that matches a MEMS array grid pattern. The fiber array is attached to a mounting flange. A lens array is aligned and attached to the fiber array. Fiber and lens position errors are very tightly controlled.

Figure 2:
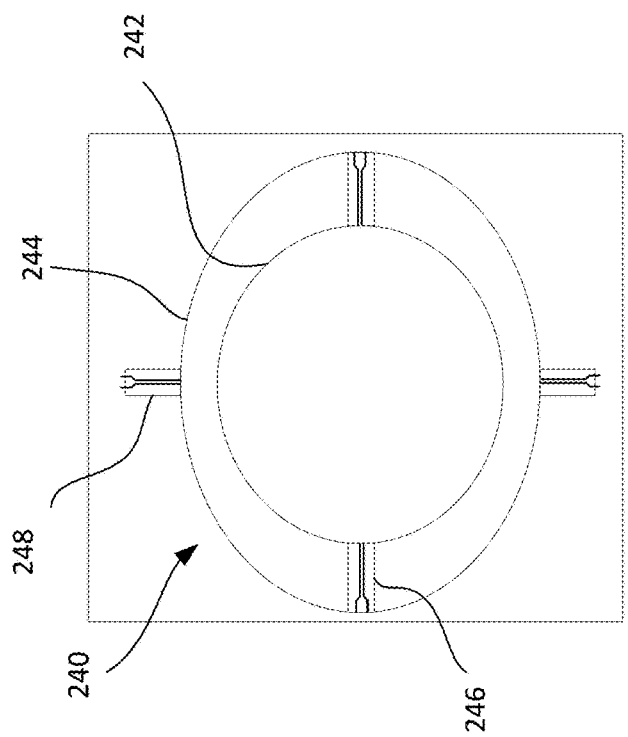
FIG. 2 is an example MEMS mirror according to aspects of the disclosure.

FIG. 2 illustrates an example MEMS mirror 240. The MEMS mirror 240 may vary in size, for example depending on implementation. By way of example only, the MEMS mirror 240 may be between approximately several hundred microns and several hundred millimeters. The MEMS mirror 240 may be highly reflective. For example, the MEMS mirror 240 may be coated with a highly reflective material, such as gold or other material. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately between +/−1-10 degrees when a voltage ranging between tens of volts to hundreds of volts is applied across the electrodes.

Figure 3:
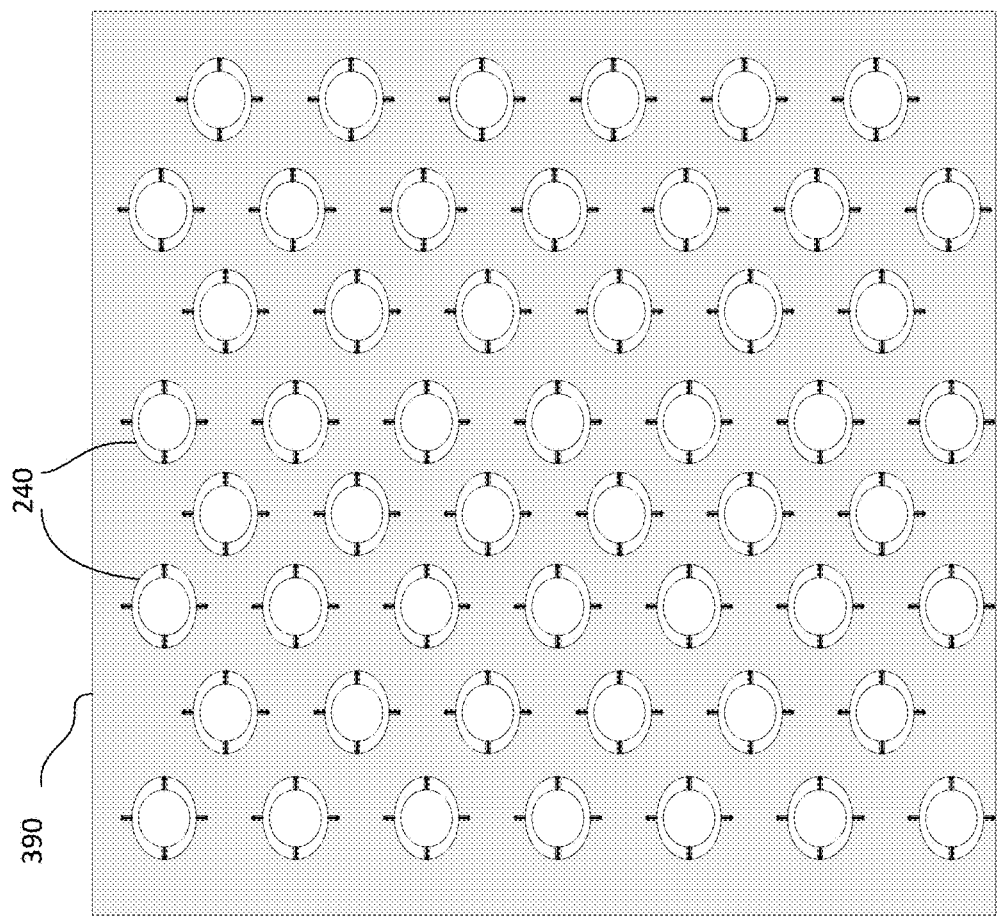
FIG. 3 is an example die including an array of MEMS mirrors according to aspects of the disclosure.

FIG. 3 illustrates an example die including an array of MEMS mirrors 240. According to some examples, the MEMS die packages include MEMS mirror arrays, but in other examples any number of MEMS mirrors may be included. The die may be hermetically sealed inside a package with a window in its lid. Not all of the mirrors may be needed or used at the same time. For example, only the best mirrors and fibers in a MEMS mirror array may be selected to make an optical switch, which may be divided as a number of ports and a number of spares.

Figure 4:
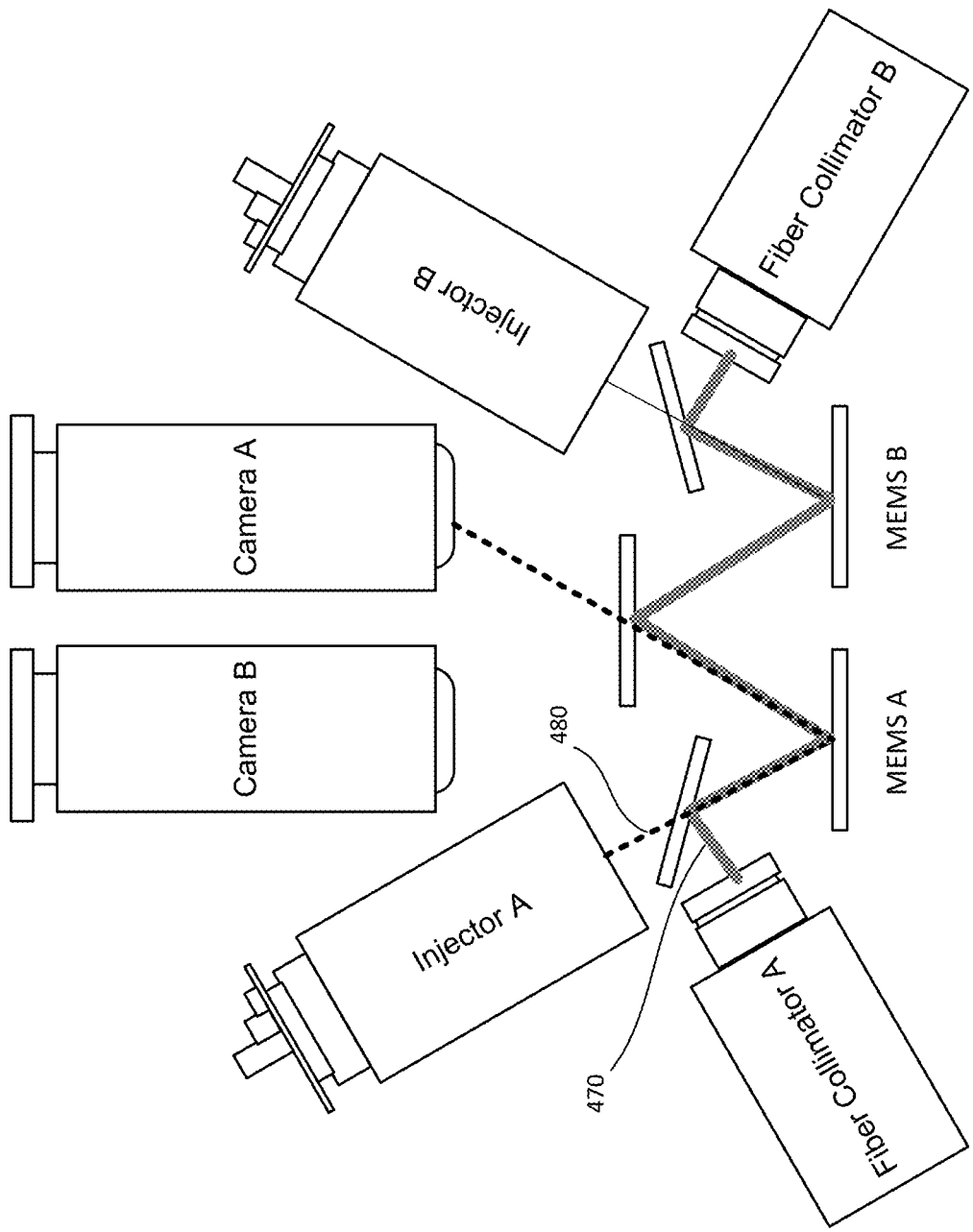
FIG. 4 is an example data path and optical path of the optical core according to aspects of the disclosure.

FIG. 4 provides an example of a data optical path and a monitor optical path included in the optical core. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber can be coupled to any output fiber. The injectors shine a plurality of small laser beams on the MEMS. The cameras image the beams reflected from the MEMS to measure the mirror positions.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS.

Figure 5:
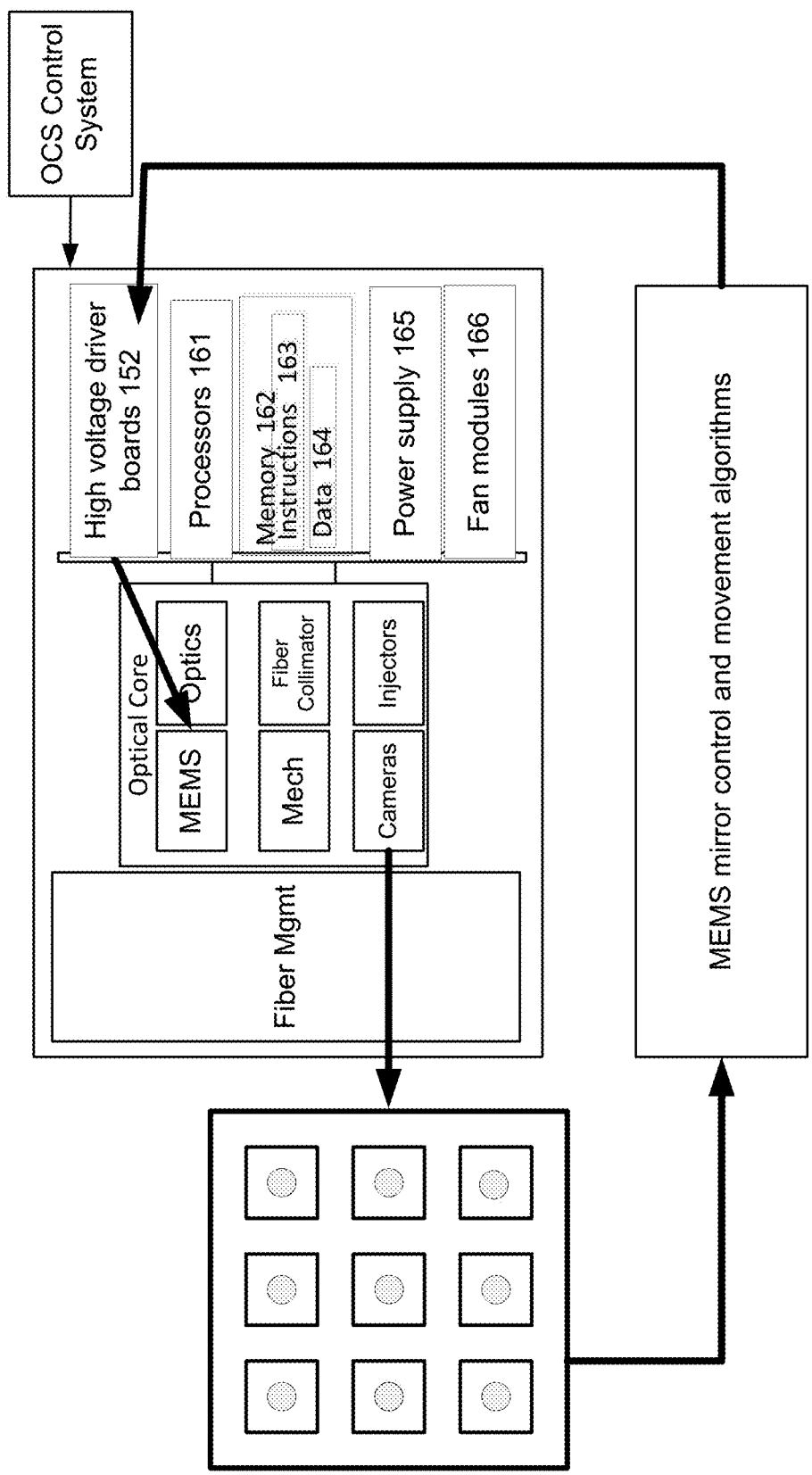
FIG. 5 is an example mirror control loop according to aspects of the disclosure.

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

Figure 6A:
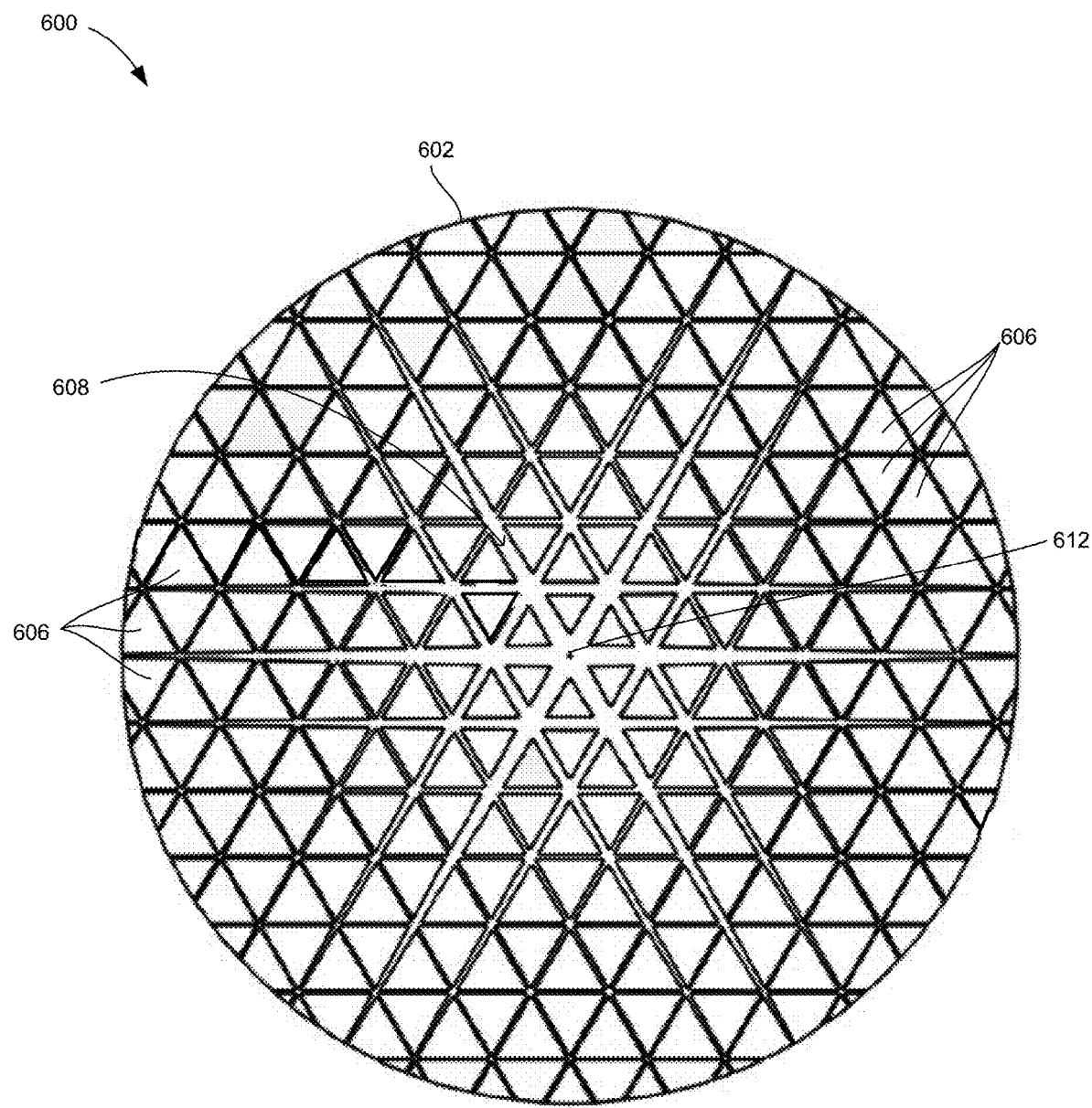
FIGS. 6A and 6B are examples of a portion of a MEMS mirror having a triangular pattern according to aspects of the disclosure.

FIG. 6A illustrates an example reflector region of a MEMS mirror. The reflector region 600 may be the inner portion 242, as shown in FIG. 2, of MEMS mirror 240. In some examples, reflector region 600 may only be a portion of inner portion 242. Yet in other examples, the reflector region may be an outer portion 244 of MEMS mirror 240. Thus, the reflector region 600 may be located on any portion of the MEMS mirror.

Reflector region 600 may be defined by a perimeter 602. The perimeter 602 of reflector region 600 may be a circle, square, hexagon, polygon, or any other shape.

A first surface of the reflector region 600 may be the non-reflective, backside surface. A second surface, opposite the first surface, may be the reflective surface.

The first surface of reflector region 600 may include a layer 608. The layer 608 may be a solid piece of silicon, nitride, poly-silicon or any other suitable material. The layer 608 may be etched, thereby creating a pattern in the remaining portions of the layer 608. In some examples, the layer 608 may be applied or deposited in the desired pattern. Layer 608 may influence the radius of curvature of reflector region 600. The pattern of layer 608 reduces a mass of the mirror as compared to having a solid layer or a patterned layer with uniform width, and also impacts the moment of inertia of the MEMS mirror, which may allow the MEMS mirror to be rotated more easily.

The second surface of the reflector region may include the reflective surface. For example, the second surface may include solid silicon or other material. According to other examples, the second surface may include a highly reflective coating, such as chrome, gold, aluminum, dielectrics, or other materials. The materials for the reflective surface may be selected based on the intended use case, wavelength range, or other factors.

Layer 608 may provide a degree of stiffness to the MEMS mirror. MEMS mirrors without layer 608 may deform in shape. For example, the MEMS mirror may curl, such as due to the stress on the material. Therefore, applying layer 608 may increase the stiffness of the MEMS mirror to prevent the deformation of the MEMS mirror.

Figure 6B:
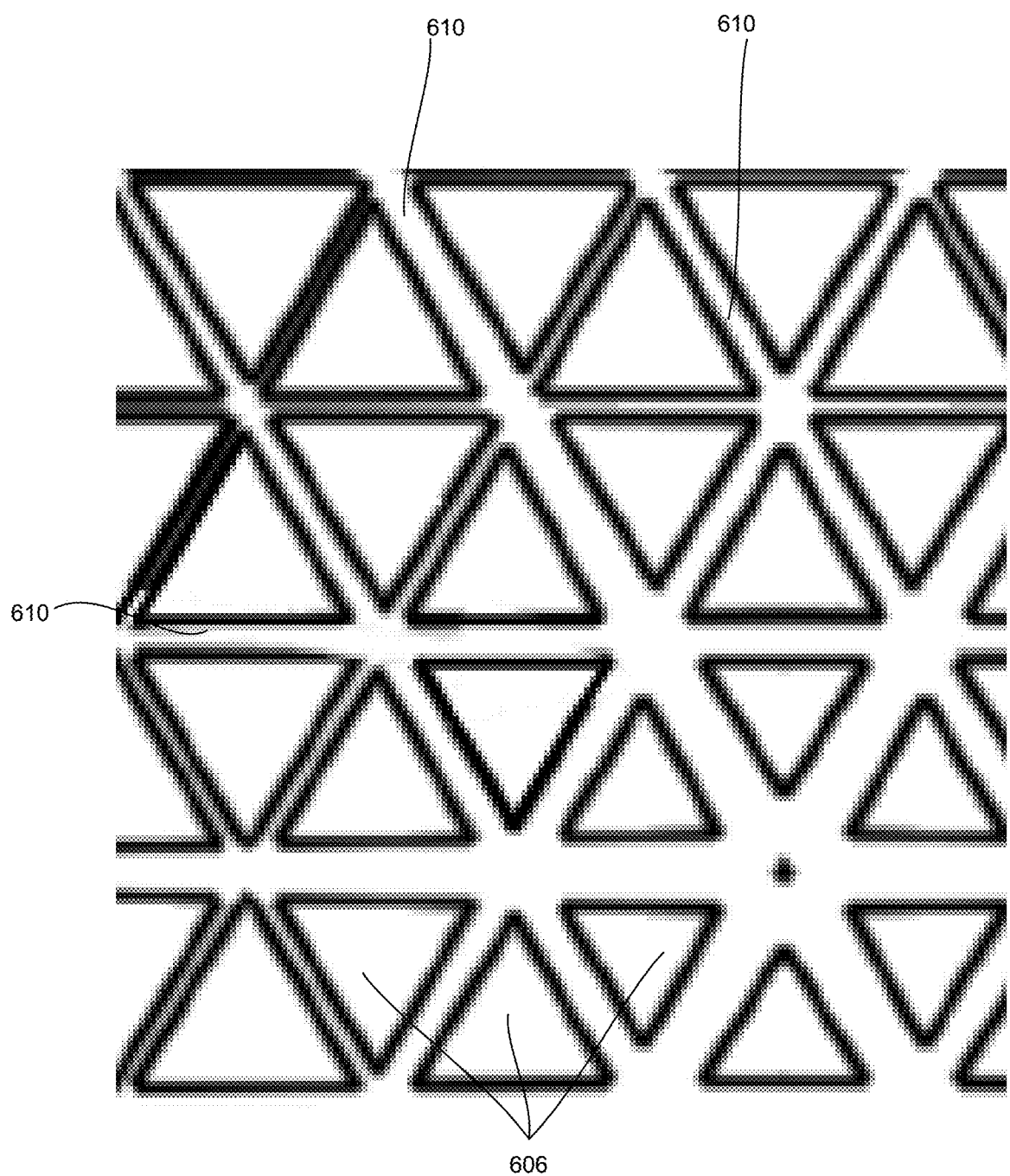

Layer 608 may begin as a solid or complete layer and be etched into the pattern shown in FIG. 6A or any other variable mesh pattern, several non-limiting examples of which are illustrated in the following figures. As shown in FIGS. 6A and 6B, the pattern may be triangular. As shown, a plurality of triangles may radiate outwardly from a center 612 of the backside of the reflector region 600. Open areas 606 may be the triangles, for example, that were etched away. In such examples, the open areas may be completely etched, such as to remove an entire depth of the material of the layer 608 in the area. In other examples, the open areas may be etched such that a percentage of the depth of the material is removed, while leaving in that area some material of a shallower depth as compared to the original layer. The pattern may be symmetrical. For example, pattern may be symmetrical about a diameter of the reflector region 600. While this pattern is described in this example as being etched from a solid layer, it should be understood that in other examples the same pattern may be formed by depositing material in the formation of the pattern onto the backside of the reflector region. According to some examples, there may not be a rib 610 around perimeter 602, while in other examples (not shown), there may be a rib around the perimeter 602.

FIG. 6B shows a zoomed-in portion of the pattern shown in FIG. 6A. The pattern may include a plurality of ribs 610. A rib 610 may be located between each of the open areas 606. Thus, the rib 610 may be the portion of layer 608 that remains on the backside of the reflector region 600.

The ribs 610 may vary in width. For example, referring back to FIG. 6A, ribs 610 may taper from a first width at the center 612 of reflector region 600 to a second width at the perimeter 602, wherein the first width is greater than the second width. The taper may be a gradual and consistent transition from the first width to the second width. The widest portion of the taper may be closest to the center 612. Thus, the widest ribs 610 may be located closest to the center 612 of reflector region 600. According to some examples, where the widest portion of multiple ribs intersect at the center 612, an area immediately surrounding the center 612 may be continuously covered by material.

The narrowest portion of the taper may be closest to the perimeter 602. The tapering of ribs 610 may create a variable mesh on reflector region 600. The variable mesh pattern may have variable spacing between open areas 606.

In contrast, a constant mesh may be a pattern that has equal spacing between each etched area. The constant mesh may include ribs of the same width throughout the pattern. Thus, the mass of the layer in the constant mesh may be distributed equally across the backside surface of the reflector region.

The mass of layer 608 that remains on the backside surface of the reflector region 600 after the pattern is formed may be distributed across the surface such that a greater mass is concentrated toward the center of the reflector region 600 as compared to portions of the reflection region near the perimeter. For example, a portion of the pattern closest to the center 612 may have more mass due to the widest ribs 610 as compared to the portion closest to the perimeter 602 which has the narrowest ribs 610. Concentrating the mass of layer 608 near the center 612 of reflector region 600 may result in a smaller moment of inertia of the reflector region 600 as compared to a reflective portion 600 having an equally distributed layer. Thus, the width of the ribs 610, and their corresponding mass, may impact the relative moment of inertia of the reflector region 600.

The relative moment of inertia may impact how long it takes the MEMs mirror to move, the shock felt by the MEMS mirror, and/or the MEMS mirror's resistance to vibration. The relative stiffness provided by the etched pattern may allow for the MEMS mirror to experience high resonance frequencies. The relative stiffness may also keep the reflective surface 600 and/or the MEMS mirror flat.

The width of ribs 610 may also determine the relative stiffness of the reflector region 600. The relative stiffness of reflector region 600 may be relative as compared to a reflector region without a patterned backside surface.

Figure 7A:
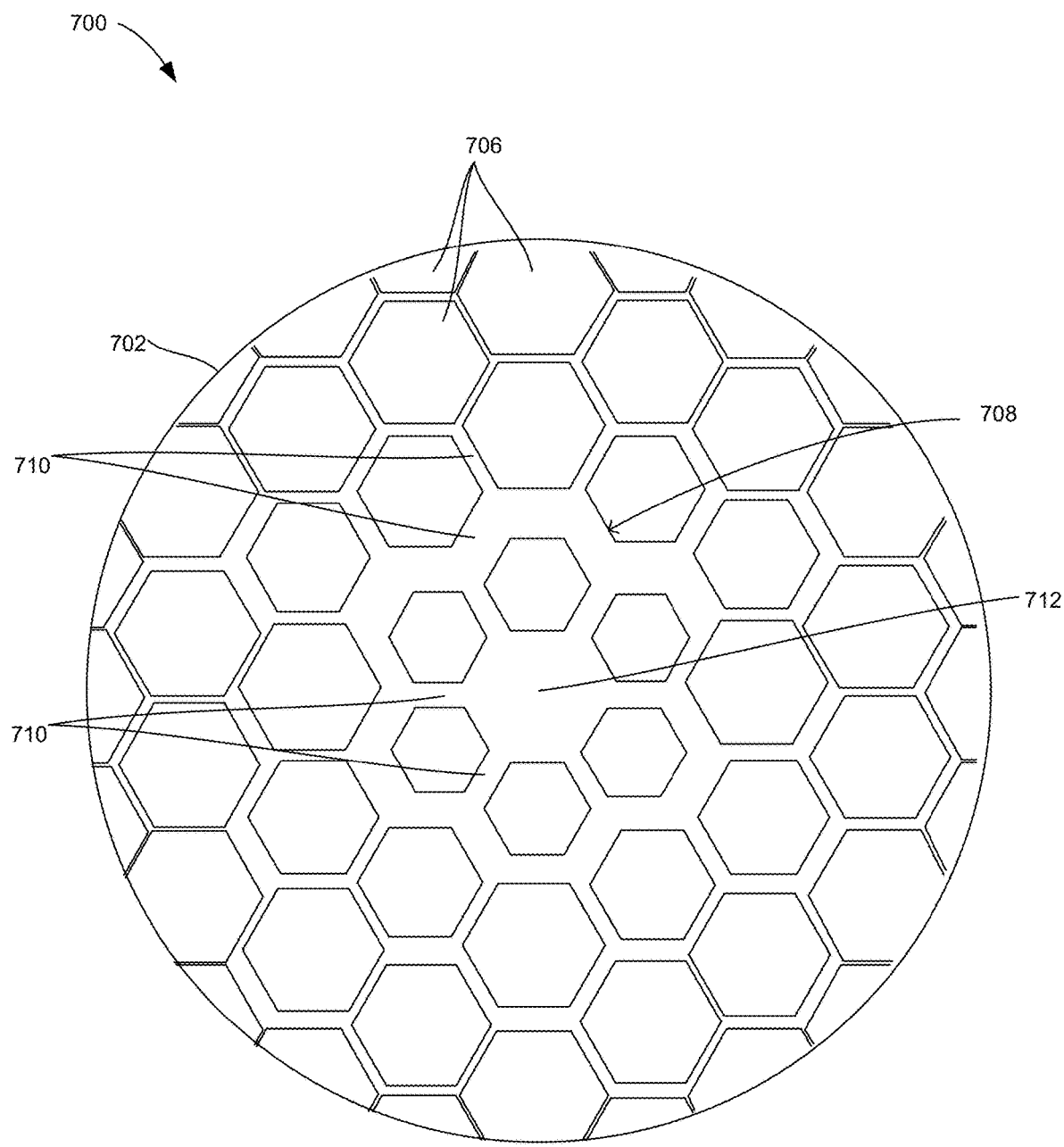
FIG. 7A is an example of a portion of a MEMS mirror having a hexagonal pattern according to aspects of the disclosure.

FIG. 7A illustrates an example backside surface of a reflector region of a MEMS mirror. Reflector region 700 is substantially similar to the reflector region 600 described with respect to FIGS. 6A and 6B and, therefore, has substantially corresponding reference numbers. As shown, reflector region 700 may be defined by a perimeter 702. The perimeter may or may not include a rib extending around the perimeter. A patterned layer 708 may be applied to a first surface, such as a backside non-reflective surface, of the reflector region 700. The layer 708 may be formed by etching a solid layer or by depositing material in the formation of the pattern. As shown in this example, the pattern 704 may include a plurality of hexagons distributed across reflector region 700. According to other examples, the pattern may include a plurality of squares, diamonds, circles, polygons, or any other shape.

According to some examples, the pattern on the backside surface of the reflector region may be symmetrical. In such an example, the distribution of mass across reflector region 700 may be symmetrical. Having symmetrically distributed mass may balance the reflector region 700 and, therefore, the MEMS mirrors. The MEMS mirrors may, therefore, rotate accurately and uniformly, without wobbling, unintentionally rotating, or resting in an undesirable position.

Similar to the example described above in connection with FIGS. 6A-B, in FIG. 7A the pattern may include a plurality of ribs 710 that may be located between each open area 706, where a thickness of the ribs 710 near a center portion 712 is greater than the thickness of the ribs 710 near the perimeter 702. The ribs 710 may transition from the thickest portions of the ribs 710 located near the center 712 to the thinnest portions of the ribs 710 near the perimeter 702. The transition of ribs 710 may create a variable mesh. In some examples, the transition may be a gradual taper. In other examples, the transition may be a non-gradual change in width. For example, the transition may be a step-like transition. In such an example, a series of steps may be defined between the center portion 712 and the perimeter, where the thickness of a given rib decreases each step as it extends from the center to the perimeter. The variable mesh created by pattern 704 may result in a greater mass near center 712 of reflector region 700 as compared to near the perimeter 702.

Figure 7B:
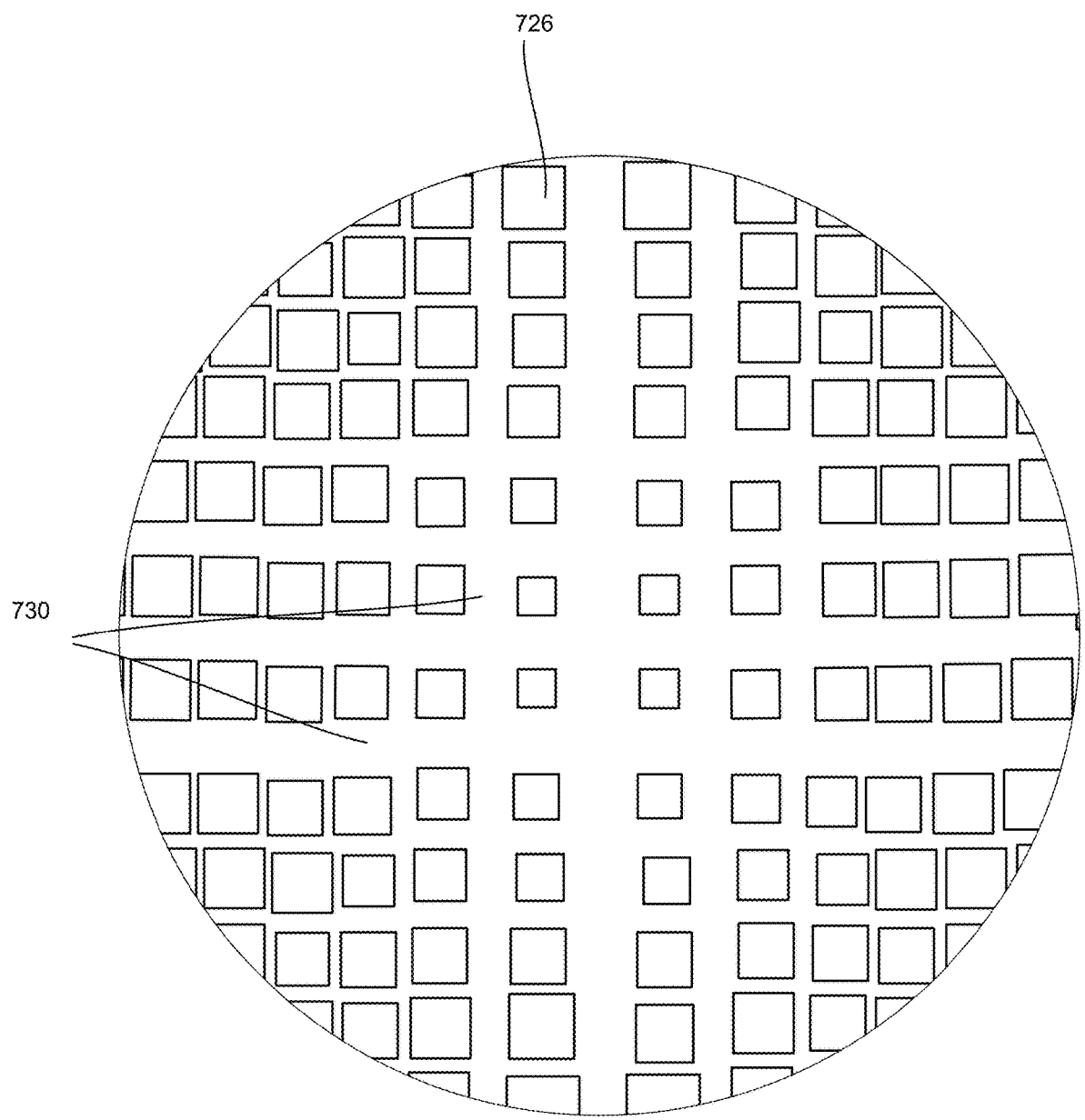
FIG. 7B is an example of a portion of a MEMS mirror having a rectangular pattern according to aspects of the disclosure.

FIG. 7B illustrates another example pattern for the variable mesh. In this example, open areas 726 may be square or rectangular shaped, with ribs 730 extending between the open areas 726. The ribs 730 near a center portion of the mirror are generally wider or greater than at portions near the perimeter. In some examples, a size of the open areas 726 may increase from a first size towards the center of the mirror to a second larger size towards the perimeter of the mirror. The ribs 730 may transition in thickness from the center towards the perimeter, which may be a gradual and consistent transition or a more distinct or step-wise transition. The size and/or distribution of the open areas 726 may also gradually transition. It should be understood that this is merely one example, and that the size, spacing, and distribution of the open areas 726 may be modified. Moreover, while the examples provide patterns with consistent shapes, such as all triangles, hexagons, rectangles, etc., it should be understood that multiple shapes may be used within the same pattern.

Figure 8A:
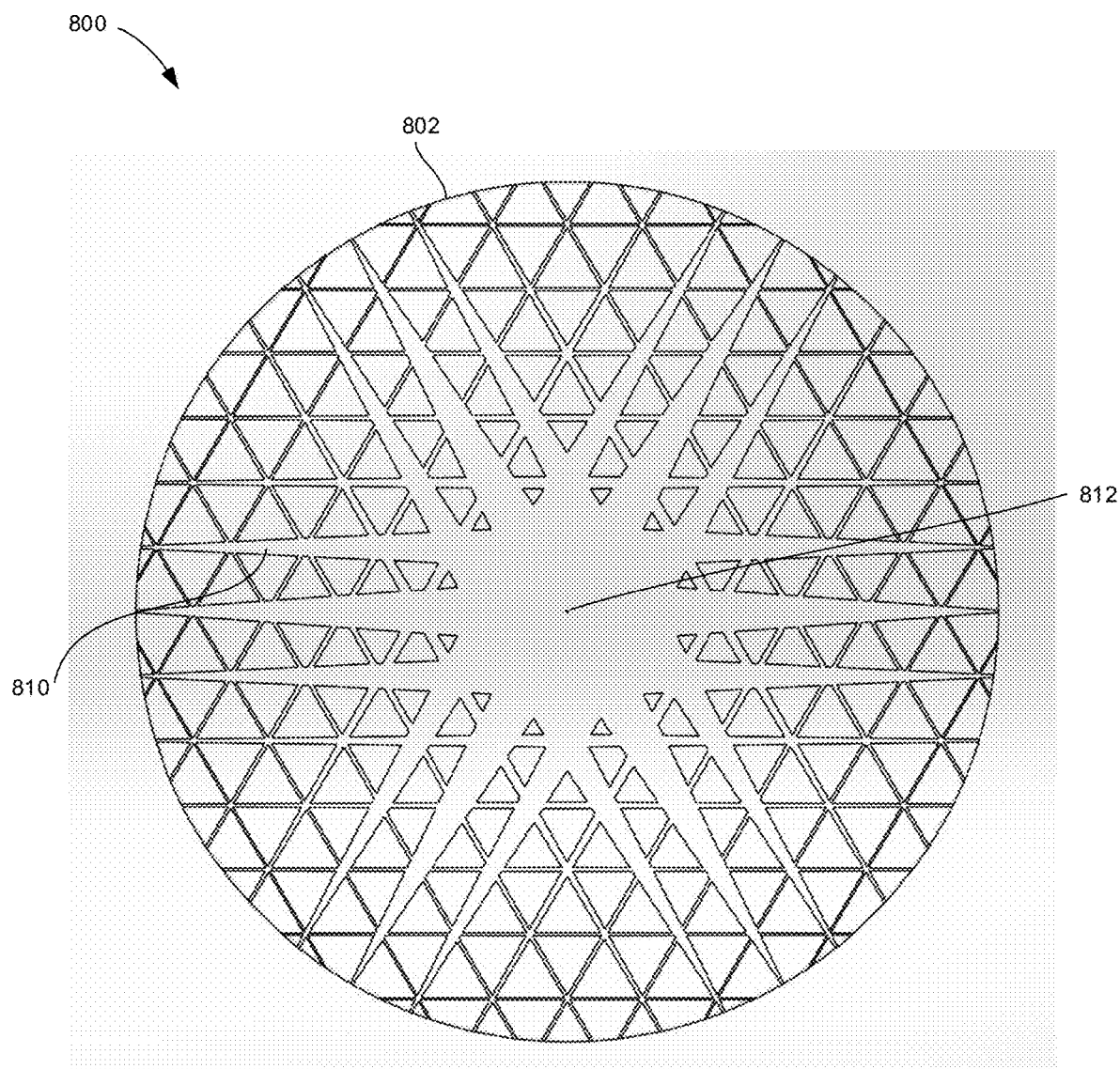
FIGS. 8A and 8B are examples of a portion of a MEMS mirror having a more concentrated mass near the center according to aspects of the disclosure.
Figure 8B:
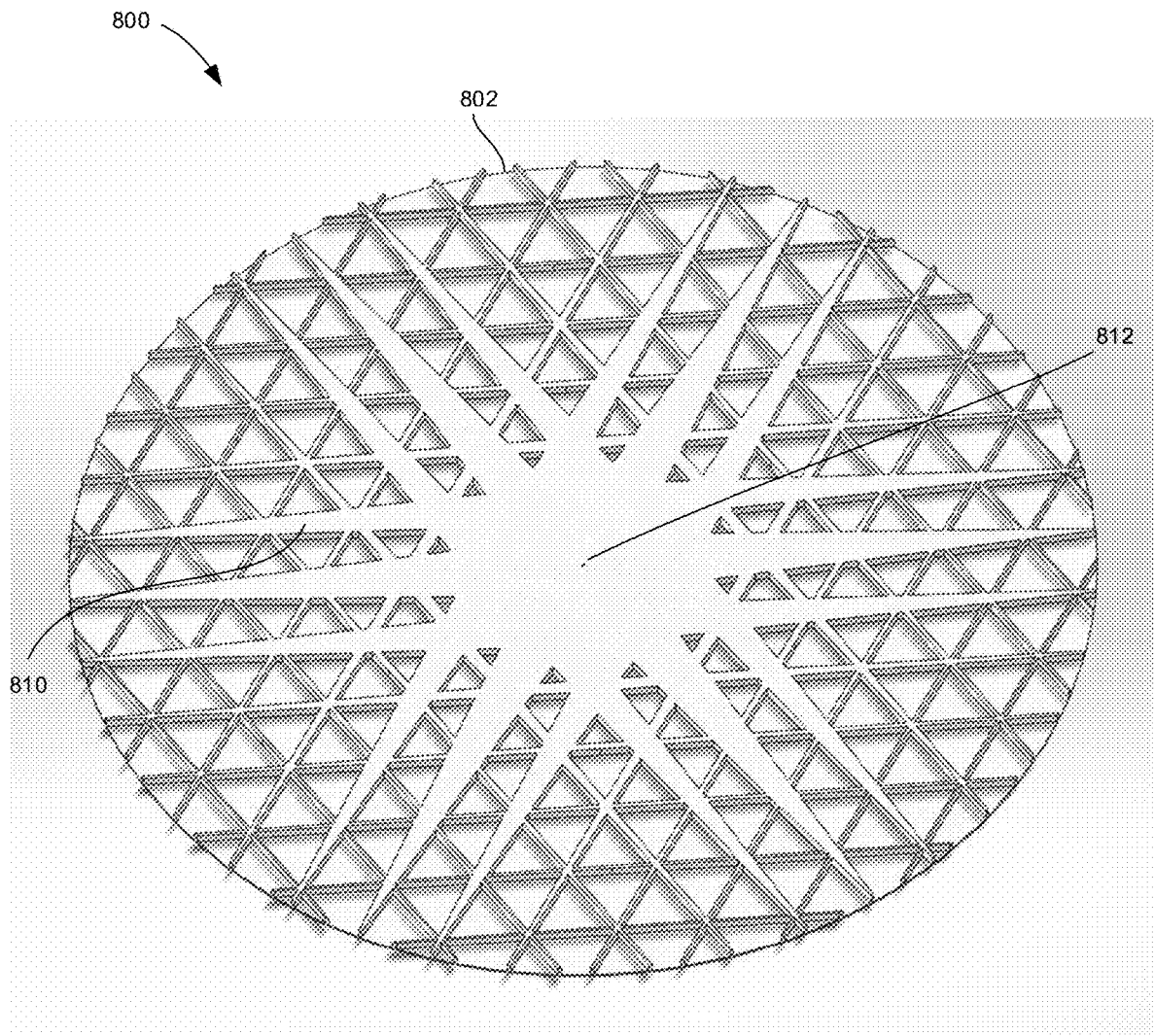

FIGS. 8A and 8B illustrate another example variable mesh pattern that may be formed on the non-reflective or backside surface of a mirror or other disc-shaped component. Reflector region 800 is substantially similar to the reflector region 600, 700 described with respect to FIGS. 6A-B, and 7A and, therefore, has substantially corresponding reference numbers. As shown, reflector region 800 has a similar pattern as reflector region 600, except the center of the reflector region 800 includes more continuously solid area as compared to the region 600. For example, a layer of material forming the ribs 810 and pattern may not be etched in the area closest to the center 812. Thus, more mass may be located near the center 812 of reflector region 800 than near the perimeter 802 of reflector region 800.

FIG. 8B shows a perspective view of reflector region 800. In this example, the perimeter 802 is not defined by a rib.

Ribs 810 may be raised from the surface of reflector region 800. According to some examples, ribs 810 may be the remaining material after a pattern has been etched in a solid layer. In other examples, the ribs 810 may be formed by selectively depositing material. Ribs 810 may be widest near center 812 of reflector region 800, and may gradually taper to a thinner rib 810 near perimeter 802.

Figure 9:
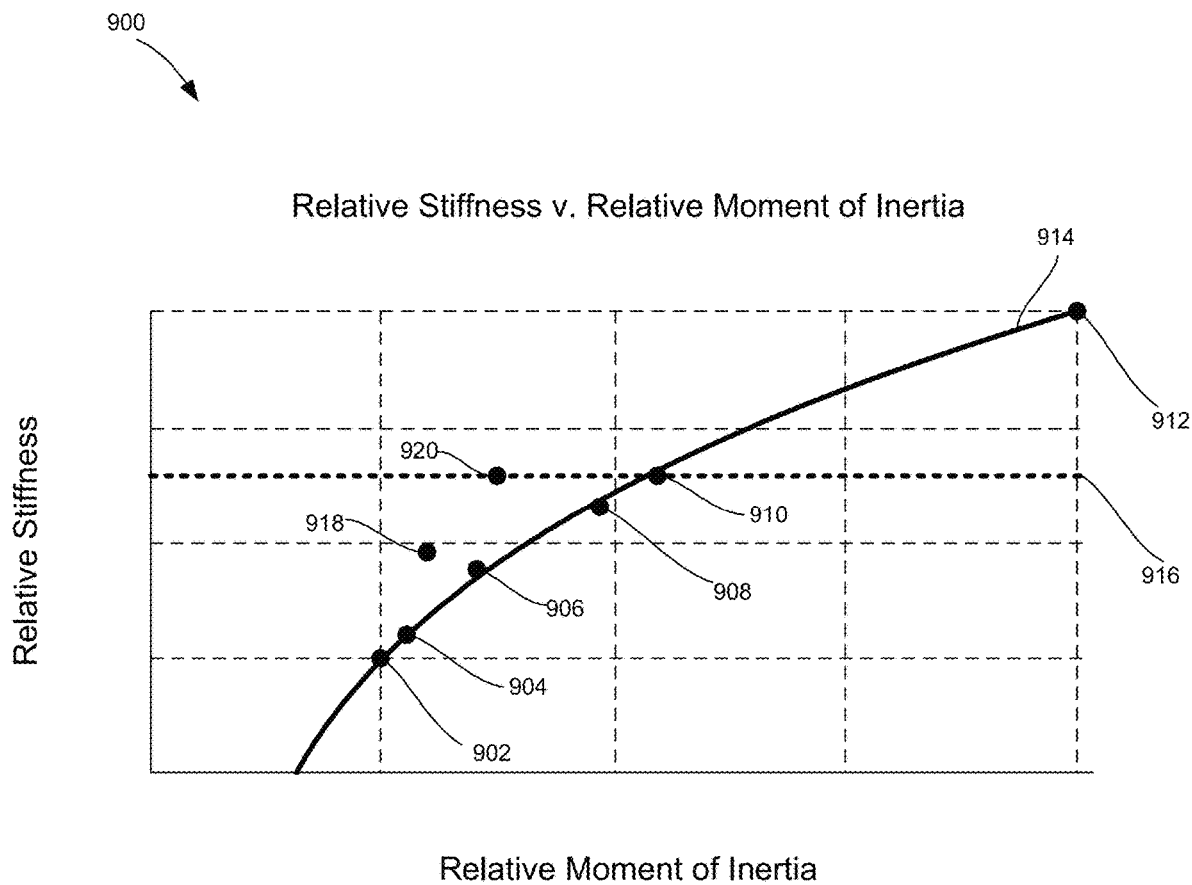
FIG. 9 is an example graph of the relative stiffness of a reflector region compared to the relative moment of inertia of the reflector region according to aspects of the disclosure.

FIG. 9 illustrates an example graph plotting relative stiffness of the reflector region as compared to the relative moment of inertia of the reflector region. A reflector region with none of the layer etched was used as a comparison for all the tests. Thus, the reflector region with none of the layer etched has a relative stiffness of 1.0 and a relative moment of inertia of 1.0, as shown by point 912 on graph 900. All the tests were based on a specific overall plate thickness. For example, the plate thickness may be 25T. The layer may have a thickness of 20 um, such that the etch depth may be 20 um to remove the layer. There may also be a specific beam separation value for each test. The beam width may be varied.

Curve 914 may fit data plotting stiffness vs. moment of inertia for a plurality of mirrors or other components, represented by points 902-912. Each of these mirrors or other components includes a continuous supporting backside surface layer, or a uniform constant mesh where ribs have the same thickness throughout.

The curve 914 indicates a proportionality between stiffness and relative moment of inertia for a MEMS mirror having a constant or non-varied mesh. As the relative stiffness increases, the relative moment of inertia may increase. The relative stiffness and/or the relative moment of inertia may be based on the mass of the reflector region. Thus, as the mass increases, the relative stiffness and/or the relative moment of inertia increases.

In contrast, data points 916 and 918 may represent the relative stiffness and moment of inertia for mirrors having a variable mesh. Line 916 may provide for comparison between point 910 and point 920. For example, while the two points indicate mirrors or other disc-shaped components having a same relative stiffness. the variable mesh design of the mirror corresponding to point 920 results in a lower moment of inertia. The variable mesh reflector regions may have an increased relative stiffness while also having a lower relative moment of inertia, as compared to the constant mesh reflector regions.

While a number of example mirror shapes and mesh patterns have been described above, it should be understood that additional shapes and/or variable patterns are possible. For example, the mirrors may be square, rectangular, oval, octagonal, etc. The mirrors may have a single axis of rotation or additional axes. Moreover, the mirrors may vary in size. For example, the variable mesh patterns may be applied to mirrors of very small size for some applications or of much larger sizes for other applications.

Figure 10:
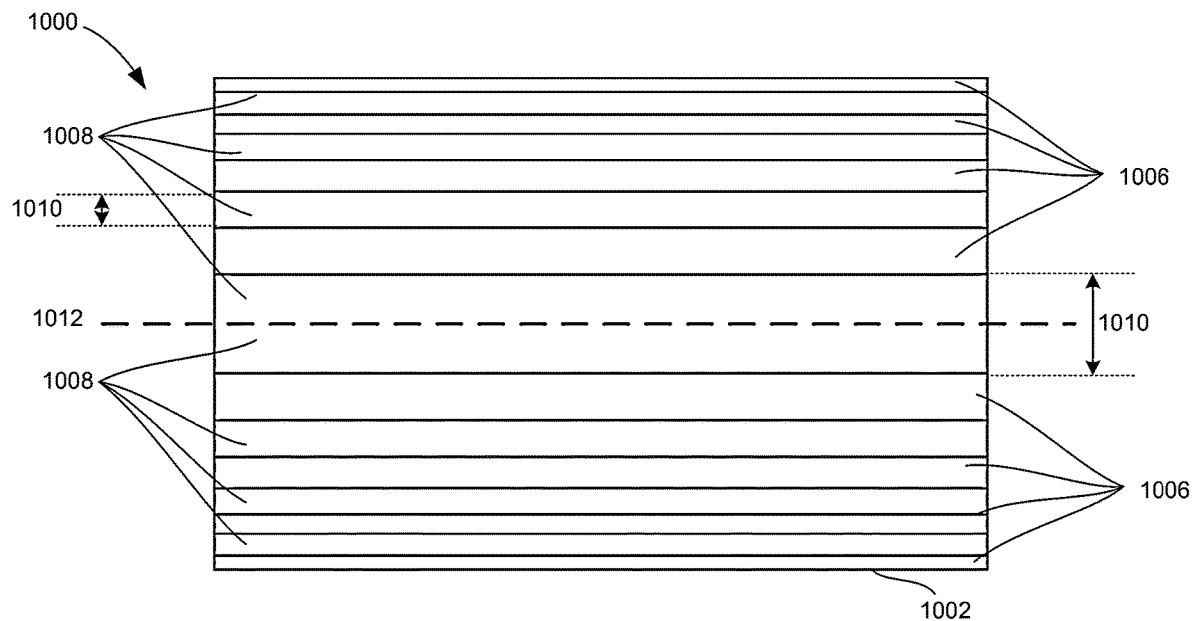
FIG. 10 is an example component having a single axis of rotation and including a variable mesh pattern according to aspects of the disclosure.

FIG. 10 illustrates an example MEMS mirror 1000 having a rectangular or square shape. The MEMS mirror 1000 may be defined by a perimeter 1002. On a first surface, such as a non-reflective surface, a layer 1008 may be applied. The layer 1008 may be silicon, nitrite, poly-silicon or any other suitable material. The layer 1008 may be etched or otherwise formed into a pattern. In some examples, the layer 1008 may be applied to the first surface in the desired pattern.

As shown in FIG. 10, the pattern may be a striped pattern. Thus, layer 1008 may be etched in lines or stripes parallel or substantially parallel to an axis 1012 of reflector region 1000. Lines or areas 1006 may be etched portions of layer 1008. Ribs 1010 may be lines or areas of layer 1008 that remain after layer 1008 is etched. Ribs 1010 may have a greater width closer to the axis 1012 of reflector region 1000. The width of each rib 1010 may decrease as the distance from axis 1012 increases. Thus, more mass may be located near axis 1012 than near at least a portion of perimeter 1002.

Figure 11:
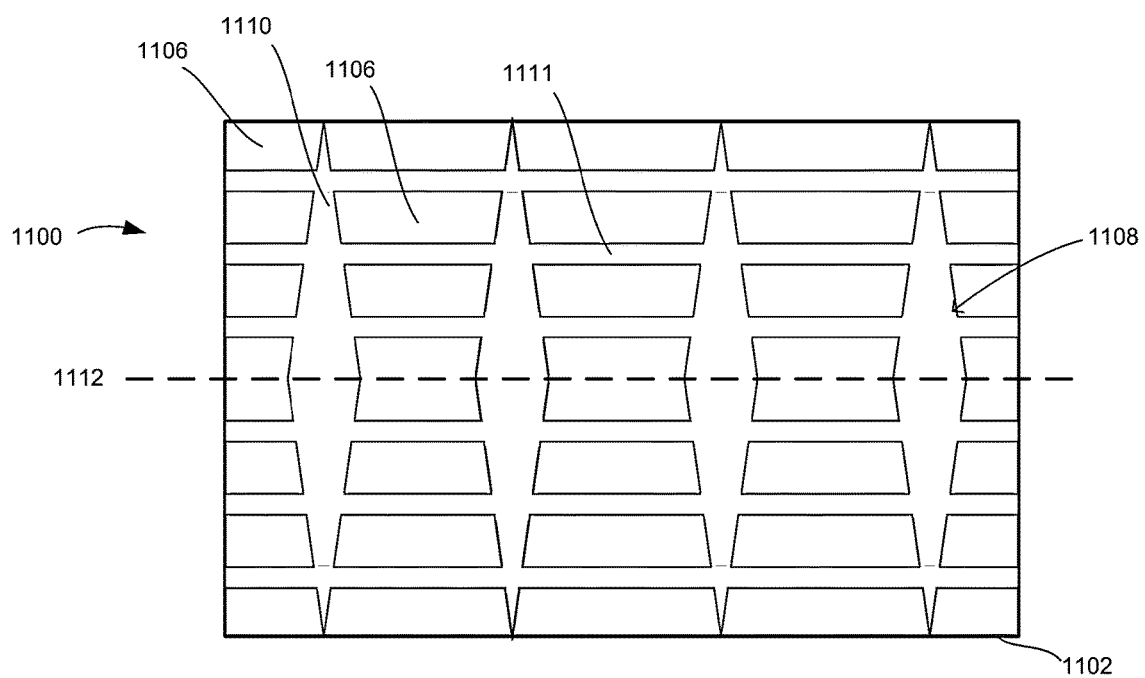
FIG. 11 is another example component having a single axis of rotation and including a variable mesh pattern according to aspects of the disclosure

FIG. 11 illustrates another example of a MEMS mirror 1100 having a rectangular or square shape. The MEMS mirror 1100 may be similar to MEMS mirror 1000 shown in FIG. 10 and, therefore, may have corresponding reference numbers. MEMS mirror 1100 may be defined by a perimeter 1102. A layer 1108 may be applied to or otherwise formed on a first surface, such as a non-reflective surface, of the MEMS mirror 1100. The layer 1108 may be applied in a pattern. In some examples, a pattern may be etched into layer 1108.

As shown in FIG. 11, the pattern may include a plurality of triangular ribs 1110. The pattern may be etched into layer 1108 such that open areas 1106 are etched away or are kept open when depositing material, and triangular ribs 1110 and horizontal ribs 1111 are formed by supportive material. Triangular ribs 1110 may have a larger width near axis 1112 as compared to the width of the triangular ribs 1110 near an upper or lower boundary of the mirror. For example, the ribs, or triangles 1110, may taper to a narrower width near perimeter 1102. Thus, more mass may be located nearest axis 1112.

An example method of manufacture of the reflector region may include applying a layer to a first surface of the reflector region of a MEMS mirror. The first surface may be, for example, a backside or non-reflective surface of the mirror. The reflector region may be defined by a perimeter, which may encompass a portion of the mirror or an entirety of the mirror. The layer may be applied as a continuous layer of material, in which case the method may further include etching a variable mesh pattern into the layer. Etching the pattern may include removing at least a portion of the layer from the surface. Removing at least a portion of the layer may create a plurality of ribs. The removed or etched portions of the pattern may be a shape. According to some examples, the shapes may be triangular, rectangular, hexagonal, circular, etc. The etched pattern may be symmetrical. According to other examples, the layer may be formed by depositing material onto the first surface in the variable mesh pattern.

The variable mesh pattern may define a plurality of ribs. The ribs closest to the center of the reflector region may have a first width. The ribs closest to the perimeter of the reflector region may have a second width. The first width may be greater than the second width such that the ribs closest to the center may be wider than the ribs closest to the perimeter. The ribs may be interconnected. The ribs may taper from the first width to the second width. In some examples, the ribs may smoothly and gradually transition from the first width to the second width. In other examples, the transition may include more defined or discrete variations or steps in width.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. For example, while the variable mesh technique is generally described in connection with MEMS mirrors and optical network systems, it should be understood that the variable mesh techniques may be applied in any of a number of different fields. By way of example only, such techniques may be implemented in telecommunications, LIDAR, free space optical communications (FSOC), etc.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A component, comprising:
    a region having a perimeter and a first surface;
    at least a first axis of rotation and a second axis of rotation;
    a layer on the first surface, the layer including a variable mesh pattern, wherein the variable mesh pattern comprises a plurality of ribs, the ribs having a first width near the first axis of rotation and a second width at portions of the first surface farther from the first axis of rotation, the first width being greater than the second width, wherein the ribs have a greater width near the second axis as compared to near the perimeter.

2. The component of claim 1, wherein the first width tapers to the second width.

3. The component of claim 1, wherein the layer has a mass distributed across the first surface such that a center portion of the first surface bears a greater proportion of the mass as compared to portions near the perimeter.

4. The component of claim 1, wherein the variable mesh pattern is a symmetrical pattern.

5. The component of claim 1, wherein the plurality of ribs are interconnected.

6. The component of claim 1, wherein the component is a mirror and the first surface is a backside non-reflective surface.

7. The component of claim 1, wherein the first axis of rotation extends across a center portion of the component, such that the first width of the ribs is near the center portion of the component and the second width of the ribs is near one or more boundaries of the perimeter.

8. A micro-electro-mechanical systems (MEMS) mirror assembly, comprising,
a plate including a plurality of cavities;
at least one mirror, the at least one mirror having a reflector region rotatable about a first axis of rotation and a second axis of rotation, the at least one mirror having a perimeter and a first surface, the at least one mirror located within a respective one of the plurality of cavities,
wherein the reflector region includes:
a layer on the first surface, the layer including a variable mesh pattern, wherein the variable mesh pattern comprises a plurality of ribs, the ribs having a first width near the first axis of rotation and a second width at portions of the first surface farther from the first axis, the first width being greater than the second width, wherein the ribs have a greater width near the second axis as compared to near the perimeter.

9. The MEMS assembly of claim 8, wherein the first width transitions to the second width.

10. The MEMS assembly of claim 9, wherein the transition comprises a gradual taper.

11. The MEMS assembly of claim 8, wherein the layer has a mass distributed across the first surface such that a center portion of the first surface bears a greater proportion of the mass as compared to portions near the perimeter.

12. The MEMS assembly of claim 8, wherein the variable mesh pattern is a symmetrical pattern.

13. A method, comprising:
applying a layer to a non-reflective surface of a reflector region of a micro-electro-mechanical systems (MEMS) mirror having a first axis of rotation and a second axis of rotation, the reflector region defined by a perimeter; and
forming a variable mesh pattern in the layer, wherein the variable mesh pattern defines a plurality of ribs, the ribs having a first width near the first axis of rotation region and a second width near the perimeter, the first width being greater than the second width, wherein the plurality of ribs have a greater width near the second axis as compared to near the perimeter.

14. The method of claim 13, wherein forming the variable mesh pattern comprises removing at least a portion of the layer from the first surface to create the plurality of ribs.

15. The method of claim 14, wherein removing a portion of the layer comprises removing less than a full depth of the layer in a given area.

16. The method of claim 13, wherein forming the variable mesh pattern comprises selectively depositing material onto the first surface in the variable mesh pattern.

17. The method of claim 13, wherein the layer has a mass distributed across the first surface such that a center portion of the first surface bears a greater proportion of the mass as compared to portions near the perimeter.

18. The method of claim 13, wherein the variable mesh pattern is a symmetrical pattern.

19. The method of claim 13, wherein each of the plurality of ribs are interconnected.

* * * * *